United States Patent [19]

Miske, Jr. et al.

[11] E Re. 30,490

[45] Reissued Jan. 20, 1981

[54] TRIGGERING CIRCUIT FOR SPARK GAP ASSEMBLIES

[75] Inventors: Stanley A. Miske, Jr., Elnora, N.Y.; James S. Kresge, Pittsfield, Mass.

[73] Assignee: General ElectricCompany

[21] Appl. No.: 918,295

[22] Filed: Jun. 21, 1978

Related U.S. Patent Documents

Reissue of:

[64] Patent No.: 3,518,492
Issued: Jun. 30, 1970
Appl. No.: 728,604
Filed: May 13, 1968

[51] Int. Cl.[2] ..... H02H 9/06

[52] U.S. Cl. ..... 361/128; 361/134

[58] Field of Search ..... 361/130, 126, 127, 128, 361/133, 134, 117, 15–17; 315/35, 36; 313/325, 231.1

[56] References Cited

U.S. PATENT DOCUMENTS

| | | | |
|---|---|---|---|
| 2,862,152 | 11/1958 | Ryden | 361/16 |
| 2,878,428 | 3/1959 | Bockman et al. | 361/16 |
| 2,890,389 | 6/1959 | Carpenter et al. | 317/61 X |
| 3,087,094 | 4/1963 | Nash | 361/130 |
| 3,320,482 | 5/1967 | Sakshaug et al. | 361/130 X |
| 3,348,100 | 10/1967 | Kresge | 317/70 |
| 3,354,345 | 11/1967 | Stetson | 361/130 X |
| 3,414,759 | 12/1968 | Connell et al. | 317/70 X |
| 3,489,949 | 1/1970 | Carpenter | 361/130 X |
| 3,513,354 | 5/1970 | Sakshaug et al. | 361/130 X |

FOREIGN PATENT DOCUMENTS 786186 11/1957 United Kingdom .

*Primary Examiner*—Patrick R. Salce
*Attorney, Agent, or Firm*—Francis X. Doyle; Richard A. Menelly

[57] ABSTRACT

A plurality of series connected main spark gaps are connected in shunt circuit relation with a voltage grading impedance network which includes a trigger gap that is connected though frequency responsive coupling means in shunt relation with approximately one-half of the series connected main spark gaps. The trigger gap is operative, as a substantially linear function of a voltage impressed across the series connected gaps, to cause the main gaps to spark over in cascade fashion. The triggered control network allows use of a large number of main gaps but with a controlled total sparkover very much less than the sum of the sparkover of the individual main gaps, thus, providing a desirably high ratio of reseal voltage to sparkover voltage for the main gap series circuit.

21 Claims, 3 Drawing Figures

TRIGGERING CIRCUIT FOR SPARK GAP ASSEMBLIES

Matter enclosed in heavy brackets [ ] appears in the original patent but forms no part of this reissue specification; matter printed in italics indicates the additions made by reissue.

This invention relates to lightning arrester spark gaps and more particularly to improvements in triggered sparkover control circuitry for effecting cascaded sparkover of a plurality of series connected main spark gaps in a current limiting lightning arrester.

Conventional lightning arresters generally comprise a non-linear valve-type resistance element, or elements, electrically connected in series with a spark gap assembly between a pair of suitable terminals mounted on opposite ends of an insulated arrester housing. In operation, when such arresters are electrically connected to protect a power system from damage due to overvoltage surges, the series circuit in the arrester is connected between the system and ground, to afford a discharge path to ground for the surge current. Basically, the arrester's valve type resistance elements present a high impedance to normal line voltage but a much lower impedance to high voltage surges. The series spark gaps, in their non-conducting condition, serve to seal the system from ground so that under normal operating conditions negligible current is conducted from the protected system through the lightning arrester to ground. When the system protected by the arrester, is subjected to a high voltage surge that is then impressed across the terminals of the arrester, the spark gaps are sparked over and the valve type resistance presents a very low impedance to this surge, thus, discharging the surge to ground through the arrester. Following the discharge of the surge current, the arrester is normally resealed by the combined action of the valve resistor increasing its resistance to the lower voltage power-follow current, and the arc stretching action of horn gaps adjacent the individual main spark gaps.

Until recent times, conventional arresters for A.C. systems allowed conduction of power-follow current until the next natural current zero following an overvoltage surge discharge. However, in modern arresters employing so-called current limiting gaps a back voltage is generated in the gaps which aids in reducing the current through the arrester such that a current zero and consequent arrester clearing is accomplished before a natural current zero. In either case, the clearing, or reseal capability of an arrester, is related to the number of series gaps it contains. That is, the greater the number of series gaps the higher will be the reseal capability.

The advent of the current limiting gap has made it possible to develop arresters capable of operating on direct current (D.C.) systems because such gaps are capable of forcing a current zero even though a natural current zero does not exist. However, because of the fact that a natural current zero does not exist on a D.C. system, it is particularly necessary to provide a consistent and reliable reseal capability in D.C. arresters.

To attain continued improvements in arrester protective levels, there has been considerable incentive to improve, or increase, the ratio of reseal to sparkover capability of the series gaps in arresters. One basic way of doing this is to increase the number of series gaps while still retaining a reasonable voltage sparkover level. In the prior art, suitably high ratios of reseal voltage to sparkover voltage have been attained for alternating current lightning arresters by utilizing various combinations of linear and nonlinear resistances in spark gap assembly voltage grading circuits of the arresters to cause cascaded sparkover of the individual gaps in the assembly, thereby lowering the assembly's sparkover voltage to a level near the spark gap's inherent reseal voltage. It is also known to provide a tirgger gap to further lower the sparkover voltage of such linear and nonlinear resistance graded spark gap assemblies. An example of such a triggered spark gap assemblies. An example of such a triggered spark gap control arrangement is disclosed in copening U.S. patent application Ser. No. 681,991, Carpenter, filed Dec. 1, 1967 and assigned to the assignee of the invention described herein.

Even with the control arrangements of the prior art, it is difficult to consistently attain reliable reseal of lightning arresters at a predetermined voltage level. This problem has been partially overcome by carefully grading the voltage distribution across the individual gaps of arrester spark gap assemblies, but this is an expensive procedure and when it is used it is difficult to predict with accuracy the reseal characteristics that will be produced for individual arresters. Of course, it is desirable to be able to consistently predict these reseal characteristics, as well as the ratio of reseal to sparkover voltage, for arresters of any given rating, so that they can be used with assurance to protect power systems having operating voltages and protective insulation characteristics. However, as noted above, with the sparkover control techniques of the prior art, the problems of consistent and predictable reseal at a suitably high ratio to sparkover voltage are substantially solved for lightning arrester applications with alternating current circuits, because the periodic zero voltage levels presented by the power-follow current from such circuits allows the arresters to be resealed against a relatively high line voltage, even though the arresters could not be resealed with these techniques against such a line voltage if it were a direct current voltage. A major advantage of our invention is that it provides means for regulating the sparkover and reseal voltages of a current limiting lightning arrester to afford a suitably high ratio of reseal to sparkover voltage for the arrester when used to protect a system transmitting either alternating or direct current.

Briefly stated, in one form of our invention, series connected main spark gaps of a lightning arrester spark gap assembly are shunted by an impedance, which includes a trigger gap that is shunt connected by a frequency responsive coupling circuit, across approximately half of the main spark gaps in the spark gap assembly. The impedance network causes the trigger gap to spark over at about half the voltage level required to sparkover the untriggered main spark gaps. Sparkover of the trigger gap initiates the cascaded sparkover of the main spark gaps so that a voltage surge is discharged through the arrester to ground. A preionizer means is provided to improve the consistency of sparkover of the trigger gap. The trigger gap is resealed or extinguished when the main gaps are sparked over and because of the short duration and low magnitude of current which it has caused it deionizes very quickly and will not be reignited by the voltage developed across the main gaps as they reseal.

An object of the invention is to provide a lightning arrester having an improved ratio of reseal voltage to sparkover voltage.

Another object of the invention is to provide a triggered voltage grading network for a spark gap assembly wherein the voltage across the trigger gap is a linear function of the voltage across the spark gap assembly.

A further object of the invention is to provide a plurality of series connected spark gaps with a triggered, voltage grading impedance network, which is operative to cause the cascaded sparkover of the series connected spark gaps while affording uniform voltage distribution across the individual spark gaps.

Still another object of the invention is to provide a multigap spark gap assembly having a consistent sparkover voltage level, which is not affected by minor variations in the respective spacings or dimensions of the individual main spark gaps in the assembly.

The invention will be better understood, and additional objects and advantages inherent in it will be more fully appreciated, from the following detailed description taken in conjunction with the accompanying drawings, and the scope of the invention will be pointed out with particularity in the appended claims.

Figure 1:
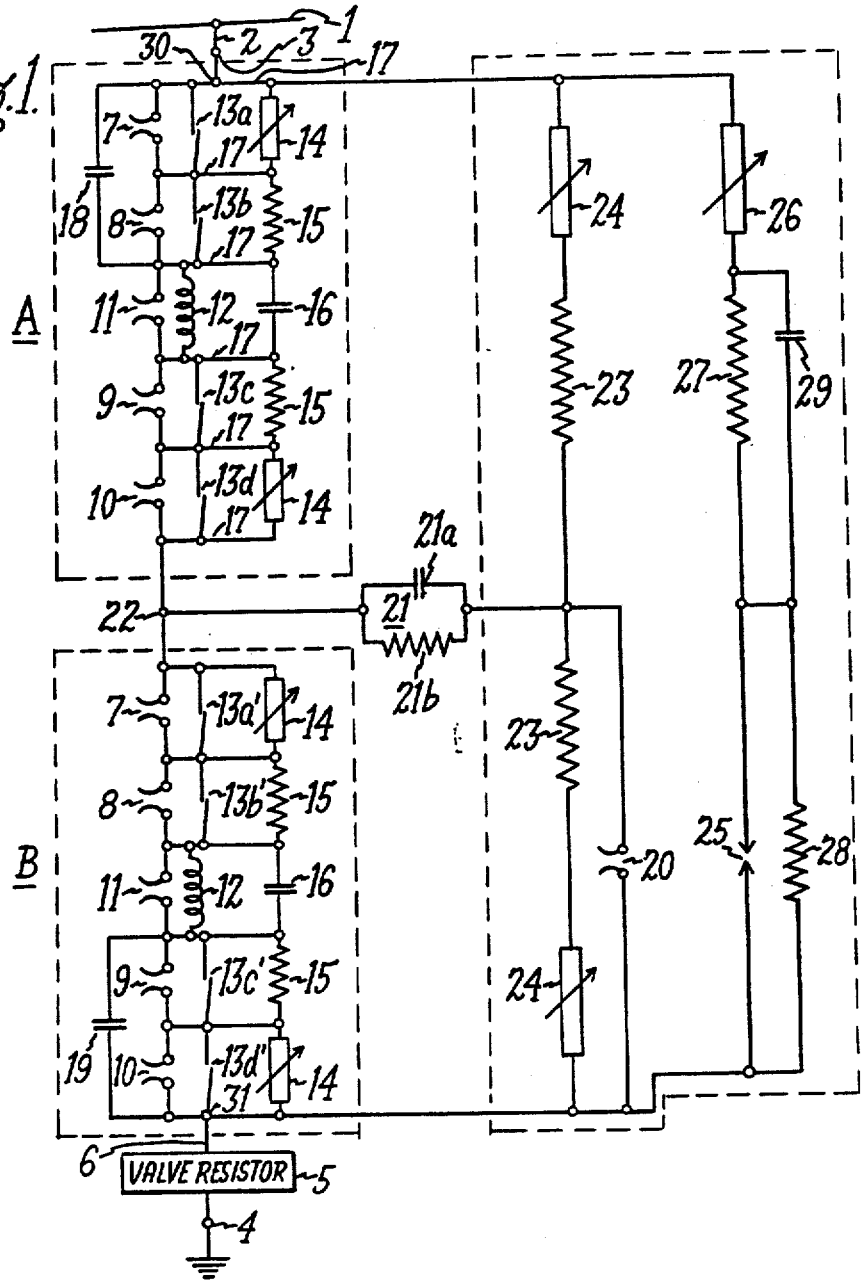
FIG. 1 is a circuit diagram and schematic illustration of a preferred embodiment of the invention shown with respect to a power transmission system.

Referring now to FIG. 1 of the drawing, there is shown a conductor 1 of a high voltage power transmission system connected by a second conductor 2 to a terminal 3. It will be understood that the terminal 3 and a second terminal 4 diagrammatically represent respective terminals mounted on oposite ends of a suitable lightning arrester housing (not shown). Within the arrester housing there is disposed a valve type nonlinear resistor, schematically shown by the block 5, series connected by a suitable conductor 6 to a plurality of spark gap assemblies, which are illustrated respectively by the dotted outlines A and B. The component parts in the respective spark gap assemblies A and B are substantially identical in structure and function; accordingly, like reference numerals will be used to designate similar parts in the assemblies A and B. It will also be understood that although only two spark gap assemblies are shown in the drawing for purposes of simplifying the description of the invention, any suitable number or such assemblies may be employed in a series connected arrangement to form lightning arrester structures having various given ratings, as is well known in the lightning arrester art.

Each of the spark gap assemblies A and B contains a plurality of series connected main spark gaps 7, 8, 9, and 10 and one (or more) coil-shunting spark gap 11. Of course, alternating protective means, such as a nonlinear valve type resistor, could be used instead of the spark gap 11, and such alternatives are within the scope of the invention. Electrically connected in series with the main spark gaps 7–10 and in shunt relation with the coil gap 11 is a suitable electromagnetic coil 12 that serves to develop an electromagnetic field substantially perpendicular to a plane through the main spark gaps 7–10, and the horn gaps associated with these spark gaps, when power-following current flows through the arrester from the transmission line 1 to ground. The magnetic fields thus developed by the respective coils 12 electrodynamically reinforce the arc-moving action of the respective horn gaps that comprise an integral structural part of the main spark gaps 7–10.

In order to provide uniform distribution of the voltage impressed across the spark gap assemblies A and B in their nonconducting condition, while simultaneously controlling the cascaded discharge of the respective main spark gaps 7–10, each spark gap assembly, A and B, is provided with an impedance network including the following components: A plurality of main spark gap ionizer means, which may be blocks of suitable preionizing material such as mica, or capacitances 13, which are shunt connected respectively across each of the main spark gaps 7–10 and electrically connected in series with each other. (The capacitances 13 are shown in FIG. 1 as: 13a, 13b, 13c and 13d, in assembly A, and as 13a', 13b' 13c' and 13d', in assembly B so that representative values individual to the respective units may be referred to hereinafter; however, in the general description of the invention these capacitances will simply be referred to with the identifying number 13.) A second series circuit including a pair of nonlinear resistors 14 and a pair of linear resistors 15 electrically connected in series with a capacitor 16. And, conductors 17 which serve to cross connect the respective elements 14, 15, and 16 in shunt relation with the capacitance ionizers 13 and the electromagnetic coil 12, as shown in FIG. 1. In addition, the two uppermost main spark gaps 7 and 8 of assembly A and the two lowermost main spark gaps 9 and 10 of assembly B are shunted respectively by capacitors 18 and 19.

Pursuant to our invention, a trigger gap 20 is electrically connected as shown in FIG. 1 through a frequency responsive coupling means 21, comprising a paralleled capacitor 21a and resistor 21b, to a terminal 22 that forms a common junction point between spark gap assemblies A and B. Trigger gap 20 may also be energized through a voltage grading circuit comprising a pair of substantially identical linear resistances 23, 23 electrically connected in series with a pair of substantially identical nonlinear resistors 24, 24 which are connected between the outermost terminals of spark gap assemblies A and B, as shown in FIG. 1.

The triggered control circuit, as described thus far, can be operated to provide the basic objectives of our invention; however, to assure consistent and accurately predictable spark-over of the trigger spark gap 20, in the preferred form of the invention, a preionizer spark gap 25 is disposed adjacent trigger gap 20 to ionize the trigger gap 20 at a voltage lower than the un-ionized sparkover voltage of the trigger gap, when a predetermined voltage is impressed across the lightning arrester terminals 3 and 4. Specifically, a nonlinear resistor 26 is electrically connected in series with a linear resistor 27 and these two components are connected in series with the preionizer gap 25, which is shunt connected across a linear resistor 28 to thus form a third series circuit that is in shunt relation with the two outermost terminals of spark gap assemblies A and B. In order to provide the desired and proper surge resonse of the preionizer gap 25 either the combination of resistors 26 and 27, or either one of these resistors separately, may be paralleled by a capacitor 29. In the preferred form of the invention illustrated in FIG. 1, only the resistor 27 is shunted by the capacitor 29.

Figure 3:
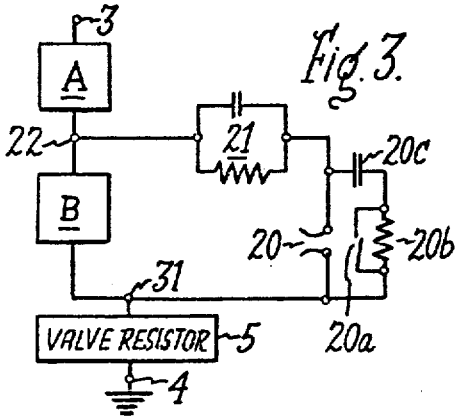
FIG. 3 is a fragmentary circuit diagram of an alternative embodiment of the invention.

Although the triggering arrangement just described is a preferred form of the invention, it will be understood that alternative means may be employed to preionize trigger gap 20. For example, as shown in FIG. 3 a corona type ionizer gap 20a is shunted by a resistor 20b and disposed in a series circuit with coupling capacitor 20c, adjacent to and shunted across trigger gap 20. In this embodiment of the invention, since a higher sparkover voltage is desired, the spacing of gap 20 is larger than the spacing of the gap 20 shown in FIG. 1. Also, components 23 through 29 (shown in FIG. 1) are not necessary, and are omitted from this simplified embodiment of the invention. Of course, this modified form of preionized trigger circuit may be connected to like numbered terminals 22 and 31, of the spark gap assembly arrangement shown in FIG. 1 as assemblies A and B, as indicated. In operation, the triggering sequence of this alternative embodiment of the invention is identical to that obtained with the triggering and ionizing circuit shown in FIG. 1.

It should be noted that the respective components for the frequency responsive coupling means 21 should always be selected to provide a time constant that will allow capacitor 21a to be discharged through resistor 21b in the shortest time interval anticipated between successive overvoltage surges on the particular protected transmission line 1, with which the invention is to be used. In addition, it will be appreciated that the value of linear resistor 27 should be sufficient to limit the current through preionizer gap 25 both when a surge voltage is passed at relatively low impedance through nonlinear resistor 26, and when reverse voltage builds up across spark gap assemblies A and B as they reseal, so that the gap 25 will not be eroded, causing it to change its sparkover voltage level. It will also be appreciated that in the preferred embodiment of our invention shown in FIG. 1 the sparkover voltage of trigger gap 20 is preset to approximately one-quarter of the untriggered sparkover voltage of the series connected spark gap assemblies A and B, since in this embodiment the trigger gap 20 is shunt connected across approximately one-half of this series circuit, i.e., across spark gap assembly B. Of course, as will become apparent from the following description of the operation of our invention, in other embodiments of the invention where trigger gap 20 is electrically connected in shunt relation with a different proportion of the main series circuit comprising the series connected main spark gap assemblies of the lightning arrester, the trigger gap would be set to sparkover at a different proportion of the over-all untriggered sparkover voltage of the series connected spark gap assemblies. Also, pursuant to the teaching of our invention, the preionizer gap 25 is adapted to sparkover and ionize trigger gap 20 when approximately 25 percent of the sparkover voltage of trigger gap 20 is developed by linear resistor 28 across the ionizer gap 25. Of course, this ratio of sparkover between the ionizer gap 25 and trigger gap 20 can be varied within wide limits in different embodiments of the invention. Finally, for the remainder of the discussion of the invention herein, it will be assumed that the main spark gap assemblies A and B are of the current limiting type although it will be evident to those well versed in the art that the basic principles of this invention could also be applied to any type of series connected gaps. The current limiting type of gap is stressed here because that type gap is directly applicable for use in D.C. arresters which is one of the more advantageous applications of the invention.

An understanding of the operation of the preferred embodiment of our invention will be facilitated by a description of the sequence of events that occur in the circuit shown in FIG. 1 when a high voltage surge is discharged to ground followed by the subsequent resealing of the spark gap assemblies A and B. Assuming a normal line voltage is present on transmission line 1, the spark gaps 7–10 as well as the trigger gap 20 and ionizer gap 25, are all in their unsparkedover condition, i.e., they are not conducting. Accordingly, since the nonlinear resistors 14, 24 and 26, respectively disposed in the three shunt connected series circuits between the terminals 3 and 4 of the protective lightning arrester, present a high impedance to line voltage, no appreciable current is discharged from the transmission line 1 through the arrester or its impedance network to the ground terminal 4. In this condition, it should be understood that the impedance network components 12–19 are selected to grade the voltage across the spark gaps 7–11 so that the voltage across the endmost gaps 7 and 10 of each spark gap assembly A and B is slightly greater than the voltage across the inner main gaps 8 and 9. The grading is so chosen to give a slight upset in voltage distribution at normal operating voltages because it is desirable to have a uniform distribution of voltage occur between the gaps 7–10 at the clearing voltage of the arrester, which voltage is somewhat greater than the normal operating voltage. At the same time, the voltage across trigger gap 20 is always maintained equal to one-half of the normal line voltage since the pairs of resistors 23 and 24 are identical in value, respectively. A very small part of the normal line voltage appears across the ionizer gap 25, since linear resistor 28 comprises a small part of the series impedance in the circuit including nonlinear resistor 26 and linear resistor 27.

Now, assuming an overvoltage surge is transmitted to terminal 3 from transmission line 1, the voltage across ionizer gap 25 rises disproportionately fast in relation to the voltage rise across trigger gap 20 and the main spark gaps 7–9, because the grading circuit for gap 25 is unbalanced. Specifically, it will be noted that the impedance of nonlinear resistor 26 declines rapidly at the higher voltages while the impedance of linear resistor 28 remains constant; therefore, a larger percentage of the over-all voltage is dropped across resistor 28 and the ionizer gap 25 when a high voltage surge occurs. Accordingly, when a voltage equal to about 25 percent of normal line voltage is developed across the ionizer gap 25 it sparks over and, thus, preionzes trigger gap 20. If the overvoltage surge continues to rise to high enough level, the voltage across trigger gap 20 also continues to rise and when the voltage grading network comprising the pairs of resistors, 23 and 24, causes a potential approximately equal to the normal line voltage to be applied across the trigger gap 20, this gap sparks over. Since capacitor 21a in the frequency responsive coupling means 21 cannot support an instantaneous voltage, the sparkover of trigger gap 20 essentially connects the terminal 22, between spark gap assemblies A and B, to ground potential and the entire surge voltage, i.e., approximately twice normal line voltage is suddenly impressed across spark gap assembly A. The main spark gaps in spark gap assembly A are then sparked over by the grading network 12–19 in the sequence; spark gap 9, spark gap 10, spark gap 8, spark gap 7 and finally the coil gap 11. The complete sparkover of the main spark gaps 7–10 in spark gap assembly A causes capacitor 21a to be fully charged to the voltage then present at terminal 3, or to approximately twice the normal line voltage. This overvoltage is sufficient to cause the main spark gaps 7–10 in spark gap assembly B to sparkover sequentially in the same order as the main spark gaps in assembly A sparked over. The overvoltage surge is then discharged to ground through valve resistor 5 which presents a low impedance to the high voltage.

As soon as spark assembly B sparks over completely, it short circuits the trigger gap 20 and, thus, rapidly clears the arc across this gap 20. Following the discharge of the overvoltage surge to ground, power-follow current from transmission line 1 is momentarily discharged through the sparked over main gaps 7–10, but due to the current limiting action of the sharply increased impedance value presented by nonlinear resistor 5 to these much lower voltages, and the arc stretching, current limiting effect of the horn gaps associated with each of the main spark gaps 7–10, a reverse voltage is rapidly built up across the spark gap assemblies A and B. Because of the preset sealing characteristics of the main spark gaps 7–9, when this reverse voltage reaches approximately 80 percent of the triggered sparkover voltage of spark gap assemblies A and B, i.e. approximately 150% of normal line voltage, the main spark gaps 7–10 clear and the lightning arrester is resealed. The impedance network, 13–15 and 17–18 uniformly distributes the line voltage across the main spark gaps 7–10 so that none of these gaps can restrike. Trigger gap 20 does not restrike as the reverse voltage builds up above normal line voltage to the point where it reseals spark gap assemblies A and B, because it is designed to spark over only when twice normal line voltage, rather than 80 percent of that value is present at terminal 3. On the other hand, the ionizer gap 25 may be sparked over by the reverse voltage as it exceeds normal line voltage, but the current limiting action of linear resistor 27 prevents damage to the electrodes of ionizer gap 25 during the short interval that this gap is sparked over piror to the time that line voltage stabilizes at its normal value following reseal of main gaps 7–9.

It should be appreciated from the foregoing description of the circuitry and operation of our invention, that the voltage across trigger gap 20 is a linear function of the voltage across the series circuit including spark gap assemblies A and B. Thus, the bias effect normally present when linear-nonlinear triggered control circuits are utilized to cascade spark gap assemblies of lightning arresters is minimized with our invention. In other words, the sparkover voltage of trigger gap 20 is essentially independent of whether the voltae is increased from zero to its sparkover value, or from a previously set D.C. "bias" value of either the same or opposite polarity with respect to the overvoltage surge applied to the trigger gap 20.

A significant advantage of our invention resides in the fact that the operating components required to practice the invention are small enough to enable them to be placed in modular form on a spark gap assembly within a lightning arrester housing. An appreciation of this fact will be attained by reference to FIG. 2 wherein there is illustrated a spark gap assembly A and B embodying the operating components discussed above with reference to FIG. 1. Like reference numerals are used to designate like parts in FIG. 2, with relation to those shown in FIG. 1. Thus, the spark gap assembly A and B comprises a pair of end terminal plates 30 and 31 mounted on opposite ends of a plurality of stacked porous insulating discs 32 through 43. The main spark gaps 7–10 are disposed respectively between adjacent pairs of insulating discs 32–43 in spark gap arcing chambers defined by the abutting upper and lower surfaces of the respective discs, in any suitable manner. For example, the discs 32–43 may be assembled in the manner described more fully in U.S. Pat. No. 3,131,273, E. W. Stetson, issued Sept. 29, 1964 and assigned to the assignee of the present invention. Although the main spark gaps 7–10 are not visible in FIG. 2, their respective locations are designated by the reference numerals 7', 8', 9' and 10', and the gaps are electrically connected in series, with electromagnetic coils 12, as shown by the circuit diagram in FIG. 1. Bus bars 44 and 45 are connected respectively at 44' and 45' to the terminal plates 30 and 31 to form an electrical connection between these respective members. The bus bars 44 and 45 are mounted on opposite ends of an insulating board 46 which shields the operating components of the circuit of our invention from the housing of spark gap assemblies A and B. Electrically connected in a series circuit between the bus bars 44 and 45 are a pair of nonlinear resistors 24 and a pair of identical linear resistors 23. The parallel coupling circuit 21, comprising capacitor 21a and linear resistance 21b, is electrically connected to terminal 22 and the upper end of spark gap electrode 20, comprising electrodes 20' and 20''. Shunting the voltage grading impendance network for trigger gap 20 is another series circuit comprising a nonlinear resistor 26 electrically connected in series with a linear resistor 27 and a second resistor 28 between bus bars 44 and 45. Shunted across linear resistance 28 is ionizer gap 25, which is disposed adjacent the trigger gap 20. Electrically connected in series with the ionizer gap 25 and in shunt with the resistor 27 is capacitor 29. As noted above, a plurality of such spark gap assemblies may be used in any given lightning arrester to determine the rating of the arrester as is well known in the lightning arrester field. The important feature to be noted here is that our invention affords an ideal modular arrangement that is readily adaptable for use with the conventional modular concept utilized in present day lightning arresters.

Figure 2:
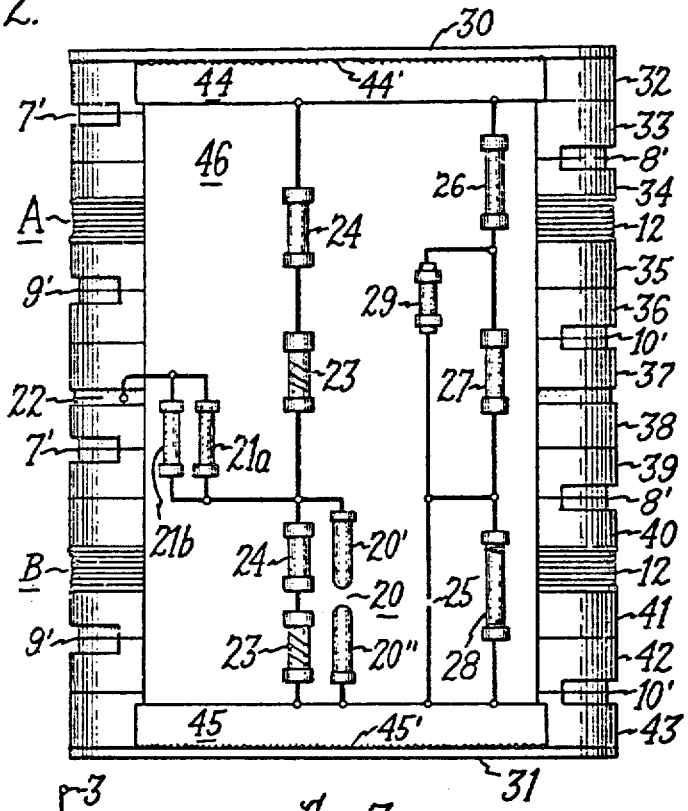
FIG. 2 is a side elevation of a preferred embodiment of the invention.

It will be understood that specific values of resistance and capacitance for the respective elements shown in the circuit diagram of FIG. 1 and the illustration of FIG. 2 will be determined by the design parameters of a particular lightning arrester, and the operating voltage of the system with which the invention is to be utilized. However, to facilitate an understanding of the invention, representative values for these various components are given below, by way of example, for a particular arbitrarily selected operating rating and a ratio of reseal to sparkover voltage of approximately 80 percent, and further assuming that two spark gap assemblies A and B are to be used, each arbitrarily rated for clearing approximately six kilovolts D.C. We have found that to consistenly provide such clearing the gap spacings of main spark gaps 7–10 should be approximately .044 inch. With such main spark gap spacing, by selecting the values of nonlinear resistors 14 and linear resistors 15 to effect a uniform distribution of voltage across the main spark gap at the desired clearing voltage of 6 kilovolts each for assemblies A and B, and using values of capacitance as shown in the following table, it is possible to obtain a sparkover level for the series connected main spark gap assemblies A and B of approximately 14 kilovolts each for relatively slow frequency high voltage surges, and a sparkover level of 11-12 kilovolts for relatively high frequency voltage surges. To obtain these sparkover values, the following capacitances can be utilized:

| Capacitors: | Rating in picofarads |
|---|---|
| 13a | 12 |
| 13b | 1 |
| 13c | 4 |
| 13d | 8 |
| 16 | 50 |
| 18 | 20 |
| 13a' | 4 |
| 13b' | 1 |
| 13c' | 1 |
| 13d' | 12 |
| 16' | 50 |
| 19 | 10 |

With this arrangement, since it is desired to have a ratio of reseal to sparkover voltage of approximately 80 percent, the sparkover voltage for the series connected assemblies A and B should be approximately 16 kilovolts. Accordingly, the trigger gap 20 is manually preset to sparkover at 8 kilovolts. As noted above, the voltage grading network comprising the linear resistors 23 and nonlinear resistors 24 serves to equally divide the voltage applied across the spark gap assemblies. A and B so that one-half of the supplied voltage is impressed across the trigger gap 20. Therefore, the values of the resistors 23 and 24 can vary between fairly wide limits, the important parameter being that they divide the voltage equally. It is also desirable to maintain the value of linear resistors 23 large enough to limit the sparkover current so that the contacts of trigger gap 20 will not be eroded enough to cause them to change their sparkover level. The values of resistance in the ionizer circuit including ionizer gap 25 also may vary within wide limits, it only being necessary to select the relative values of resistors 27 and 28 so that when a high frequency, high voltage surge is impressed across this series circuit the ionizer gap 25 will spark over when the voltage level across the spark gap assemblies A and B is approximately 13 kilovolts, or roughly 75 percent of the voltage level required to sparkover the trgiger gap 20. Again, the magnitude of linear resistor 27 should be sufficient to prevent erosion of the ionizer gap 25 when it is sparked over. This feature is particularly important in the ionizer circuit because, as noted above, the ionizer gap remains sparked over for a relatively long period of time, both while the high voltage surge is being discharged and during the reverse voltage build up that reseals the spark assemblies A and B.

The following summary is provided in order to facilitate a fuller understanding of the invention, as well as to demonstrate the present necessity of providing some of the solutions it affords, so that lightning arrester technology can overcome existing barriers and continue its evolution. At the outset it was noted that lightning arresters must be manufactured to a given desired ratio of reseal to sparkover voltage, by way of example, a ratio of 80% was assumed in describing preferred embodiment of the invention. It was then observed that generally four series connected spark gaps, each being spaced to form a gap of .044 inch can, when uniformly graded, reliably clear or reseal against only about 6 kilovolts D.C. Therefore, to attain the desired 80% ratio of reseal to sparkover voltage some means must be provided to cause the series connected gaps to have an equivalent sparkover of about 8 kilovolts total, whereas the sum of their individual sparkovers is about 20 kilovolts.

It was found that by using conventional linear-nonlinear resistance grading techniques the sparkover of the four series-connected, .044 inch spaced gaps could only be reduced to approximately 12 to 14 kilovolts while maintaining uniform voltage grading at a clearing capability of 6 kilovolts. However, by employing the teachings of the present invention, two sets of such series connected gaps, which are in turn connected in series, are controlled by means of a trigger gap to give a total sparkover voltage of 16 kilovolts (or the desired 8 kilovolts per four-gap set). Thus, a total of eight series connected gaps having a total uniformly graded sparkover of about 40 kilovolts is controlled to yield a total sparkover voltage of 16 kilovolts with a circuit that maintains uniform voltage distribution, to enhance clearing or resealing of the arrester at a total voltage of 12 kilovolts.

While a particular embodiment of our invention has been shown and described, it will be obvious to those skilled in the art that changes and modifications may be made therein without departing from the invention and, therefore, it is intended by the appended claims to cover all such changes and modifications as fall within the true spirit and scope of the invention.

What we claim as new and desire to secure by Letters Patent of the United States is:

1. A spark gap assembly comprising [means defining]:

a plurality of main spark gaps electrically connected in a first *and a second* series circuit, a trigger gap connected in shunt relation with [a first portion of] said first series circuit, *said first and second series circuits* including a predetermined number *of pairs* of said main spark gaps, *each pair of said main gaps being shunted by a first linear resistor and a first nonlinear resistor in series,* impedance means electrically connected in series with said trigger gap [in said shunt circuit relation,] whereby a [predetermined proportional increment of a] voltage across said first series circuit is impressed across said trigger gap, said trigger gap having a sparkover voltage substantially higher than the sparkover voltage of one of said main gaps and substantially lower than the sparkover voltage of [the] *said* first series circuit when it is not triggered, *said first linear and nonlinear resistors being selected to provide a uniform distribution of voltage across said mains gaps.*

[2. A spark gap assembly as defined in claim 1 wherein said predetermined number of main gaps comprises at least two of said gaps.]

3. A spark gap assembly as defined in claim 1 wherein said predetermined number of main gaps is approximately one-half of the total number of gaps in said plurality of main spark gaps.

4. A spark gap assembly as defined in claim 3 wherein the sparkover voltage of said trigger gap is equal to approximately one-quarter the untriggered sparkover voltage of said first series circuit.

[5. A spark gap assembly as defined in claim 2 including means for grading a voltage across said first series circuit to distribute substantially equal voltages across each of said main gaps at their desired reseal voltage rating.]

6. A spark gap assembly as defined in claim 1 including preionizing means to preionize said trigger gap, and means to energize said preionizing means in response to a voltage across said first series circuit such that said trigger gap is ionized at a voltage lower than its sparkover voltage.

7. A spark gap assembly as defined in claim 6 wherein said preionizing means comprises a preionizer spark gap disposed adjacent the trigger gap and adapted to sparkover at a voltage lower than the sparkover voltage of said trigger gap, and means electrically connecting said preionizer gap in shunt relation with said first series circuit.

[8. A spark gap assembly as defined in claim 2, in combination, with an insulating lightning arrester housing, a nonlinear resistance material disposed in said housing, means for mounting said spark gap assembly in said housing, electric terminals disposed adjacent opposite ends of said housing, and means electrically connecting said first series circuit of said spark gap assembly in series with said nonlinear resistance material between said terminals.]

9. The invention defined in claim 8 including electromagnetic means for driving arcs formed between said main spark gaps toward the periphery of the spark gap arcing chambers in said housing.

10. The invention defined in claim 9 wherein said electromagnetic means comprises at least one conducting coil disposed around the spark gap assembly and electrically connected in series with said first series circuit through said assembly, and including protective means shunting said coil to prevent it from being damaged by an overvoltage surge.

11. A spark gap assembly as defined in claim 1 wherein, said impedance means is voltage responsive and adapted to offer a relatively low impedance to high voltages and to offer a relatively high impedance to low voltages.

12. A spark gap assembly as defined in claim 5 wherein said means for grading voltage comprises an impedance network including a plurality of series connected ionizer capacitances, each of said series connected ionizer capacitances respectively being shunt connected across one of said main spark gaps.

13. In a lightning arrester, a plurality of spark gap assemblies, each of said assemblies comprising:

a plurality of main spark gaps electrically connected in a first *and second* series circuit, means electrically connecting each of said first *and second* series circuits in series to form a larger series circuit, at least one trigger gap connected in shunt circuit relation with [at least one portion of said larger] *said first* series circuit, said trigger gap having a sparkover voltage substantially higher than the sparkover voltage of one of said main gaps and substantially lower than the sparkover voltage of said [larger] *first* series circuit when it is not triggered, a [block of nonlinear resistance material,] *valve resistor and* a pair of terminals disposed respectively adjacent opposite ends of said arrester, means electrically connecting said [larger] *first* series circuit in series with said [block of nonlinear resistance material] *valve resistor* between said terminals, [and means forming] a voltage grading circuit between said terminals *comprising a first linear and a first nonlinear resistor across said first series circuit and a second nonlinear and a second linear resistor across said second series circuit* whereby a predetermined portion of a voltage impressed across said terminals is applied across said trigger gap when at least some of said main spark gaps are not sparked over.

14. The invention defined in claim 13 wherein the portion of said larger series circuit shunted by the trigger gap comprises one of said first series circuits.

[15. The invention as defined in claim 14 wherein the number of said plurality of spark gap assemblies comprises two of said assemblies.]

16. The invention as defined in claim 13 wherein said plurality of spark gap assemblies comprises an even number of such assemblies, and wherein the portion of said larger series circuit shunted by the trigger gap includes one-half of said assemblies.

17. The invention defined in claim 13 with preionizer means electrically connected between said pair of terminals and disposed adjacent said trigger gap, said preionizer means being operative to ionize said trigger gap at a voltage lower than the sparkover voltage of said trigger gap in response to a predetermined voltage being impressed across said pair of terminals.

18. The invention defined in claim 13 with a plurality of impedance networks for controlling the voltage distribution of the main spark gaps in each of said assemblies when they are not sparked over, each of said impedance networks being electrically connected to form a second series circuit shunting said first series circuit in each of said respective assemblies.

19. The invention defined in claim 18 with a frequency responsive coupling circuit electrically connected in series with the shunt circuit including said trigger gap.

20. The invention defined in claim 18 with capacitive grading means in each of said assemblies for further controlling the voltage distribution of the main spark gaps in said assemblies, each of said capacitive grading means including a plurality of electrical capacitances of various predetermined size connected to form a third series circuit through its respective spark gap assembly hunting the second series circuit in that assembly.

21. The invention as defined in claim 20 wherein each capacitance in said plurality of electrical capacitances comprises a preionizer means electrically connected and mechanically positioned such that each of the main spark gaps is shunted respectively by a different preionizer means disposed in ionizing relation thereto.

22. The invention as defined in claim 21 with a frequency responsive coupling circuit electrically connected in series with said trigger gap in the circuit establishing its shunt relation with said predetermined portion of the larger series circuit, and including preionizer means electrically connected between said pair of terminals and disposed adjacent said trigger gap, said preionizer means being operative to ionize said trigger gap at a voltage lower than its sparkover voltage in response to a predetermined voltage being impressed across said pair of terminals.

23. The invention defined in claim 13 wherein the predetermined portion of voltage impressed across said spark gap is a linear function of the voltage between said terminals when at least some of said main spark gaps are not sparked over.

24. The invention defined in claim 23 wherein the means forming a voltage grading circuit for impressing a voltage across the trigger gap comprises a second series circuit between said terminals shunting said larger series circuit and including series connected linear and nonlinear impedances, said trigger gap being shunt connected across a predetermined number of said impedances.

25. A lightning arrester comprising:

at least one [nonlinear resistance element] *valve resistor* electrically connected in series with a plurality of series connected spark gap assemblies, a predetermined number of said assemblies comprising[:] a plurality *of pairs* of main spark gaps electrically connected in a first *and a second* series circuit, *each pair of said main gaps being shunted by a linear resistor and a nonlinear resistor,* at least one trigger gap connected in shunt circuit relation with [a predetermined number of said main spark gaps,] *said first series circuit,* said trigger gap having a sparkover voltage substantially higher than the sparkover voltage of one of said main gaps and substantially lower than the sparkover voltage of said first series circuit when it is not triggered[,] *said linear and nonlinear resistors being selected to provide a uniform distribution of voltage across said main gaps* and means for energizing said trigger gap in response to a predetermined voltage being impressed across said lightning arrester.

[26. A spark gap assembly as defined in claim 25 in combination with modular mounting means in each of said assemblies for mounting said trigger gap and means for energizing said trigger gap in a predetermined relatively fixed relation with respect to said first series circuit.]

[27. A lightning arrester comprising a plurality of spark gap assemblies electrically connected to form a discharge circuit, a predetermined number of said assemblies being provided with control means for accurately regulating the sparkover voltage of the assembly, whereby the sparkover voltage of said discharge circuit is accurately regulated.]

[28. A lightning arrester as defined in claim 27 wherein said control means comprises a trigger gap and means for energizing said trigger gap in response to a predetermined voltage being impressed across said arrester, said trigger gap being adapted when energized to cause cascaded sparkover of its assembly.]

[29. A lightning arrester as defined in claim 27 wherein the unregulated sparkover voltage of each of said assemblies may vary between wide tolerances, and wherein the regulated sparkover voltage of each of said assemblies is maintained within substantially narrower tolerances by said control means.]

[30. A lightning arrester as defined in claim 27 wherein a predetermined number of said assemblies include a nonlinear valve resistance element electrically connected in series with said discharge circuit.]

[31. A lightning arrester as defined in claim 27 in combination with at least one nonlinear resistance element electrically connected in series with said discharge circuit.]

* * * * *